(12) United States Patent  
Chen et al.

(10) Patent No.: US 7,929,460 B2  
(45) Date of Patent: Apr. 19, 2011

(54) COMMUNICATION NETWORK TOPOLOGY DETERMINATION

(75) Inventors: Li-Wei Chen, Arlington, MA (US); Nick Martin, Berkeley, CA (US); Carlos Cabrera, Cambridge, MA (US); Anand Srinivas, Cambridge, MA (US)

(73) Assignee: Vanu, Inc., Cambridge, MA (US)

( * ) Notice: Subject to any disclaimer, the term of this patent is extended or adjusted under 35 U.S.C. 154(b) by 629 days.

(21) Appl. No.: 11/855,968

(22) Filed: Sep. 14, 2007

(65) Prior Publication Data

US 2009/0109868 A1 Apr. 30, 2009

Related U.S. Application Data

(60) Provisional application No. 60/825,653, filed on Sep. 14, 2006.

(51) Int. Cl.  
*H04L 12/28* (2006.01)

(52) U.S. Cl. ...................................................... 370/255

(58) Field of Classification Search .................. None  
See application file for complete search history.

(56) References Cited

U.S. PATENT DOCUMENTS

| 6,393,290 | B1 * | 5/2002 | Ufongene | 455/446 |
| 7,366,108 | B2 * | 4/2008 | Szentesi et al. | 370/254 |
| 7,620,010 | B2 * | 11/2009 | Takeda et al. | 370/328 |
| 7,620,370 | B2 * | 11/2009 | Barak et al. | 370/480 |
| 2005/0122231 | A1 * | 6/2005 | Varaiya et al. | 340/870.01 |

* cited by examiner

*Primary Examiner* — Anh-Vu Ly  
(74) *Attorney, Agent, or Firm* — Fish & Richardson P.C.

(57) ABSTRACT

A communication network topology is determined by evaluating costs of states each representing a possible assignment of hubs and remote nodes to nodes of the communication network. The hubs connect to a central network, the remote nodes connect wirelessly to the hubs and obtain connectivity to the central network through the hubs. The cost of each state is determined based on costs for configuring each node as a hub or a remote node, uplink frequencies for sending data from the remote nodes to corresponding hubs, and downlink frequencies for sending data from the hubs to corresponding remote nodes.

41 Claims, 10 Drawing Sheets

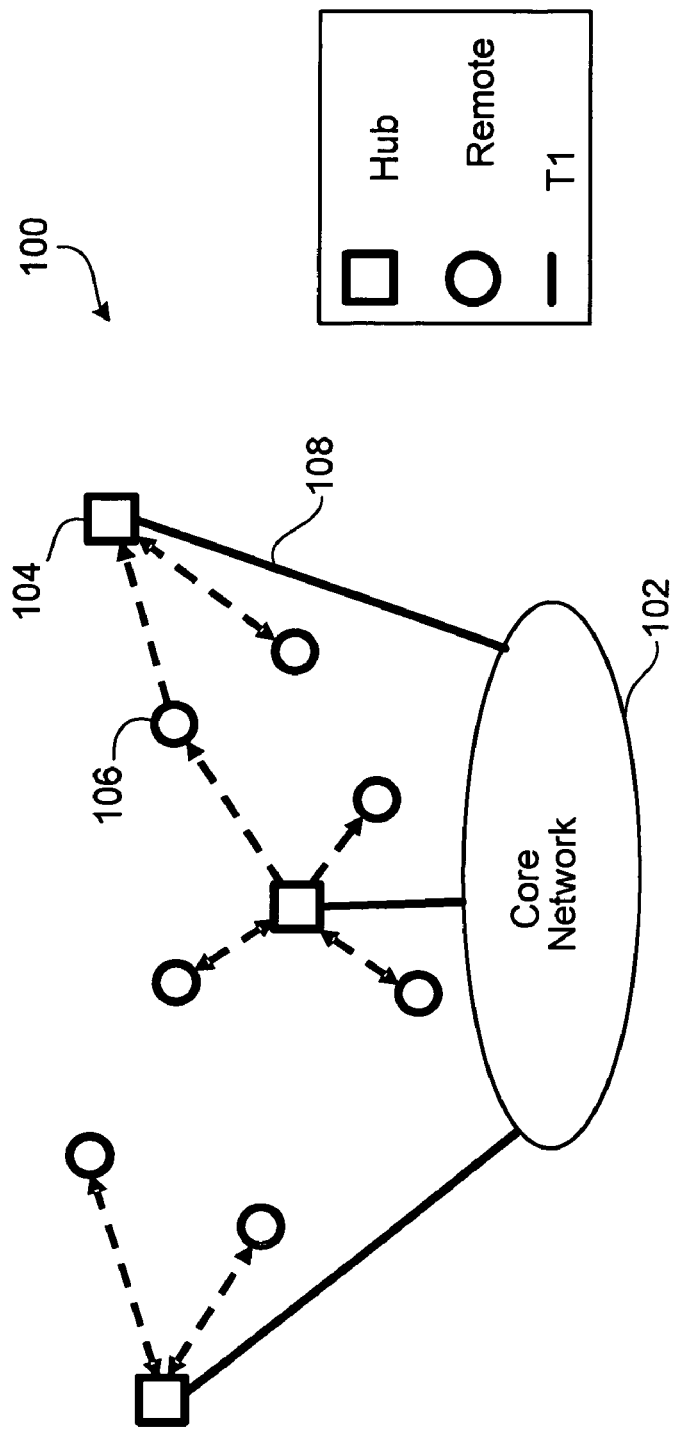
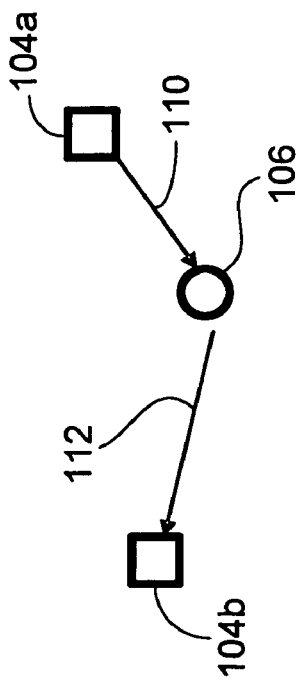
FIG. 1
FIG. 2

SIMULATION RESULTS: COST COMPARISON OF GA vs. SA SOLUTIONS — 190

| Nodes in site | Algorithm | Cost min | Cost avg | Cost max | Hub cost min | Hub cost avg | Hub cost max | Freq (up) min | Freq (up) avg | Freq (up) max | Freq (down) min | Freq (down) avg | Freq (down) max |
|---|---|---|---|---|---|---|---|---|---|---|---|---|---|
| 10 (city) | GA | 13.7 | 16.9 | 20.0 | 1.2 | 2.6 | 4.9 | 5 | 7.1 | 9 | 5 | 7.2 | 9 |
|  | SA | 13.7 | 16.9 | 19.8 | 1.2 | 2.3 | 4.2 | 5 | 7.2 | 9 | 5 | 7.3 | 9 |
| 50 (city) | GA | 33.4 | 48.5 | 65.0 | 0.9 | 7.2 | 14.3 | 16 | 21 | 27 | 15 | 20.3 | 26 |
|  | SA | 33.4 | 48.4 | 65.2 | 2.4 | 7.9 | 13.4 | 16 | 20.5 | 27 | 15 | 20 | 27 |
| 100 (city) | GA | 55.2 | 71.9 | 84.1 | 5.9 | 12.4 | 17.1 | 23 | 30.2 | 34 | 22 | 29.3 | 33 |
|  | SA | 55.0 | 71.7 | 84.2 | 6.1 | 12.5 | 21.1 | 23 | 29.6 | 34 | 22 | 29.3 | 34 |
| 10 (uniform) | GA | 17 | 19.7 | 21 | 5 | 5 | 5 | 6 | 7.4 | 8 | 6 | 7.3 | 8 |
|  | SA | 17 | 19.5 | 20.5 | 2.5 | 4 | 5 | 6 | 7.7 | 9 | 6 | 7.8 | 9 |
| 50 (uniform) | GA | 54.5 | 60.3 | 69 | 25 | 29 | 35 | 13 | 15.8 | 19 | 13 | 15.5 | 20 |
|  | SA | 53.5 | 59.7 | 68.5 | 25 | 29.3 | 32.5 | 13 | 15.2 | 18 | 13 | 15.2 | 18 |
| 100 (uniform) | GA | 84 | 90.4 | 93.5 | 37.5 | 43.3 | 47.5 | 22 | 23.8 | 26 | 21 | 23.3 | 26 |
|  | SA | 84 | 89.9 | 94 | 40 | 47 | 50 | 20 | 21.9 | 24 | 20 | 21 | 23 |

FIG. 8

FIG. 9 DOWNLINK TOPOLOGY AND FREQUENCY ASSIGNMENT OBTAINED IN A 100-NODE CITY MODEL WITH 10 CITIES. THE GREEDY ALGORITHM AND MATCHING HEURISTIC WAS USED AS A SOLVER.

GA SOLUTION TO A 100-NODE UNIFORMLY-GENERATED INSTANCE. THE FINAL SOLUTION CONSISTED OF 15 HUBS, AND 26 UPLINK AND 26 DOWNLINK FREQUENCIES.

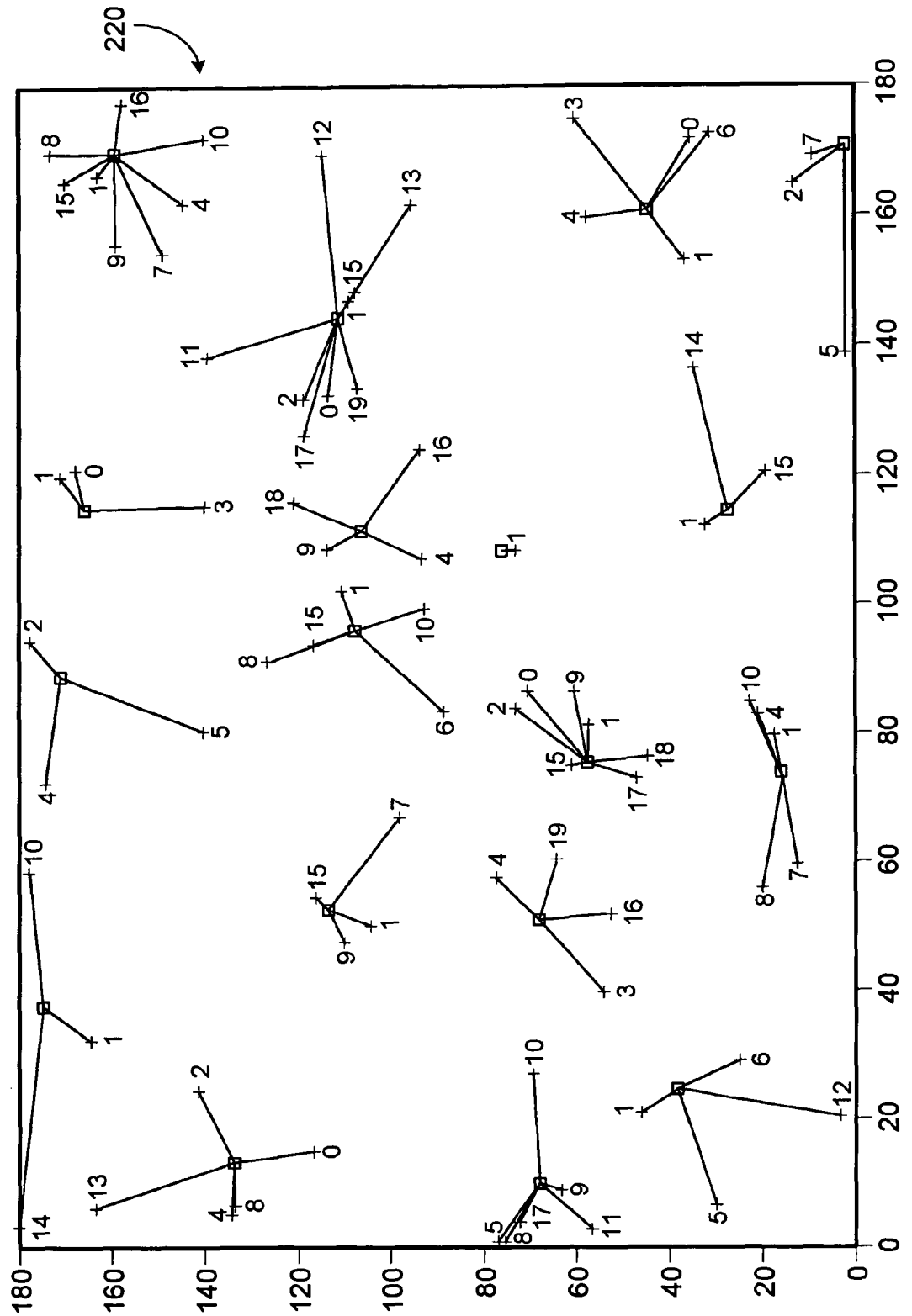
FIG. 11 SA SOLUTION TO THE 100-NODE UNIFORMLY-GENERATED INSTANCE OF FIGURE 5. THE FINAL SOLUTION CONSISTED OF 18 HUBS, AND 22 UPLINK AND 20 DOWNLINK FREQUENCIES

COMMUNICATION NETWORK TOPOLOGY DETERMINATION

RELATED APPLICATION

This application claims the benefit of, and incorporates by reference, U.S. Provisional Application Ser. No. 60/825,653, filed Sep. 14, 2006.

BACKGROUND

This description is related to communication network topology determination.

In some examples, a wired network has a topology that is fixed by the wire line connections and has a networking layer with routing that is optimized according to the given topology. Some wireless networks follow a similar design, where the network layer depends on the connectivity provided by the physical layer. Some wireless networks based on software defined radio technology can be more flexible because the networking layer can use flexible radios to control the physical topology. In some deployments, there is a large space of possible topologies subject to physical limits on connectivity due to node separation, obstructions, and similar effects.

SUMMARY

In general, in one aspect, a topology of a communication network is determined by evaluating costs of states each representing a possible assignment of hubs and remote nodes to nodes of the communication network. The hubs connect to a central network and the remote nodes connect wirelessly to the hubs and obtain connectivity to the central network through the hubs. The cost of each state is determined based on costs for configuring each node as a hub or a remote node, uplink frequencies for sending data from the remote nodes to corresponding hubs, and downlink frequencies for sending data from the hubs to corresponding remote nodes.

Implementations can include one or more of the following features. The communication network includes a cellular telephone network. The hubs and the remote nodes include base stations for communicating with end users, the central station includes a switched network, and the links between the remote nodes and the hubs provide in-band backhaul. Each node can either be a hub or a remote node, and evaluating the costs of states includes evaluating the costs of a subset of states selected from $2^N$ states, N representing the number of nodes in the communication network. Uplink relationships between remote nodes and hubs indicating which remote nodes send data upstream to which hubs are determined. Determining the uplink relationship includes assigning each remote node to a closest hub and assigning uplink frequencies such that signal-to-interference-plus-noise ratios for each uplink is above a preset threshold. Assigning each remote node to a closest hub includes assigning each remote node to a hub that is closest geographically or a hub that results in a minimum propagation loss. Downlink relationships between hubs and remote nodes indicating which hubs send data downstream to which remote nodes are determined. Determining the downlink relationships includes selecting among a plurality of possible configurations to maximize the number of remote nodes that share frequencies while maintaining the signal-to-interference-plus-noise ratios for each downlink above a preset threshold.

In some examples, a greedy heuristic algorithm can be used to evaluate the states. An iterative process can be used to evaluate the states, and at each iteration evaluate states each representing a network topology having more hubs than those represented by states evaluated at a previous iteration. When the costs of each state evaluated at an iteration are higher than the lowest cost of states evaluated at a previous iteration, the assignment of hubs and remote nodes represented by the state having the lowest cost in the previous iteration is selected as the final topology for the communication network. At each iteration, a first subset of states are evaluated and one of the first subset of states having a lowest cost is selected, and at the next iteration, a second subset of states are evaluated, each state in the second subset being derived by taking the lowest-cost state in the first subset and changing one or more of the remote nodes to hubs. In some examples, an iterative process is used to evaluate the states, and at each iteration evaluate states each representing a network topology having less hubs than those represented by states evaluated at a previous iteration. At each iteration, a first subset of states is evaluated and one of the first subset of states having a lowest cost is selected, and at the next iteration, a second subset of states are evaluated, each state in the second set being derived by taking the lowest-cost state in the first subset and changing one or more of the hubs to remote nodes.

In some examples, a simulated annealing process is used to determine a sequence of states to evaluate, including at each step of the process, evaluating one or more neighbor states of a current state and probabilistically determining whether to maintain the current state or evaluate one of the neighbor states, in order to progress generally towards states of lower costs. Neighboring states are defined such that two neighboring states differ from each other by one node in which the node is a hub in one of the two neighboring states and a remote node in the other of the two neighboring states.

In general, in another aspect, a topology of a communication network is determined by using linear programming to find a minimum of a cost function subject to a set of constraints. The cost function includes variables representing whether a node of the communication network is a hub or a remote node, variables indicating whether a set of uplink frequencies are used, and variables indicating whether a set of downlink frequencies are used. The constraints take into account signal-to-interference-plus-noise ratio requirements for the uplinks and downlinks.

Implementations can include one or more of the following features. The linear programming includes integer linear programming and the variables include one or more integers.

In general, in another aspect, a topology of a communication network is determined using an iterative process. Each step of the iterative process includes determining which nodes of the communication network are hub nodes and which nodes are remote nodes, the hub nodes connecting to a central network, the remote nodes connecting wirelessly to the hub nodes; assigning the remote nodes to the hub nodes for establishing uplink channels between the remote nodes and corresponding hub nodes; assigning frequencies for the uplink channels; assigning the remote nodes to the hub nodes for establishing downlink channels between hub nodes and corresponding remote nodes; assigning frequencies for the downlink channels; and evaluating a cost of the network configuration based on assignments of the hub nodes, uplink frequencies, and downlink frequencies.

Implementations can include one or more of the following features. Assigning the remote nodes to the hub nodes for establishing uplink channels and assigning the uplink frequencies include assigning each remote node to a closest hub node and assigning uplink frequencies such that signal-to-noise ratios for each uplink is above a preset threshold. In some examples, assigning the remote nodes to the hub nodes for establishing downlink channels and assigning the downlink frequencies include assigning each remote node to a closest hub node and assigning downlink frequencies such that signal-to-noise ratios for each downlink is above a preset threshold. In some examples, assigning the remote nodes to the hub nodes for establishing downlink channels and assigning downlink frequencies include selecting among a plurality of possible configurations to maximize reuse of frequencies while maintaining the signal to noise ratios for each downlink above a preset threshold.

In general, in another aspect, a state machine is provided to determine a topology of a communication network by evaluating costs of states each representing a possible assignment of hubs and remote nodes to nodes of the communication network, the hubs connecting to a central network, the remote nodes connecting to the hubs. A cost determination engine is provided to determine a cost of each state based on costs for configuring each node as a hub or a remote node, uplink frequencies for sending data from the remote nodes to corresponding hubs, and downlink frequencies for sending data from the hubs to corresponding remote nodes.

In general, in another aspect, an article includes a machine-readable medium that stores executable instructions that when executed causes a machine to determine a topology of a communication network by evaluating costs of states each representing a possible assignment of hub nodes and remote nodes to nodes of the communication network, the hub nodes connecting to a central network, the remote nodes connecting wirelessly to the hub nodes. The cost of each state determined based on costs for configuring each node as a hub node or a remote node, uplink frequencies for sending data from the remote nodes to corresponding hub nodes, and downlink frequencies for sending data from the hub nodes to corresponding remote nodes.

These and other aspects and features, and combinations of them, may be expressed as methods, apparatus, systems, means for performing functions, program products, and in other ways.

Advantages of the aspects and features include one or more of the following. The overall network cost can be reduced. Fast algorithms can be used to find approximate optimal solutions. Solutions for in-band backhaul can be found. Wireless spectrum can be conserved by finding a solution that maximizes sharing of frequencies. Operators of software defined radio networks can quickly re-design network topology based on changes in the network environment, such as when a site is added or removed from the network.

BRIEF DESCRIPTION OF DRAWINGS

FIG. 1 is a diagram of a communication network.
FIGS. 2 and 3 are diagrams of hubs and remote nodes.
FIG. 8 is a table of simulation results.
FIGS. 9-11 are graphs of hubs, remote nodes, and associated uplinks and downlinks.

DETAILED DESCRIPTION

1. Overview

Figure 3:
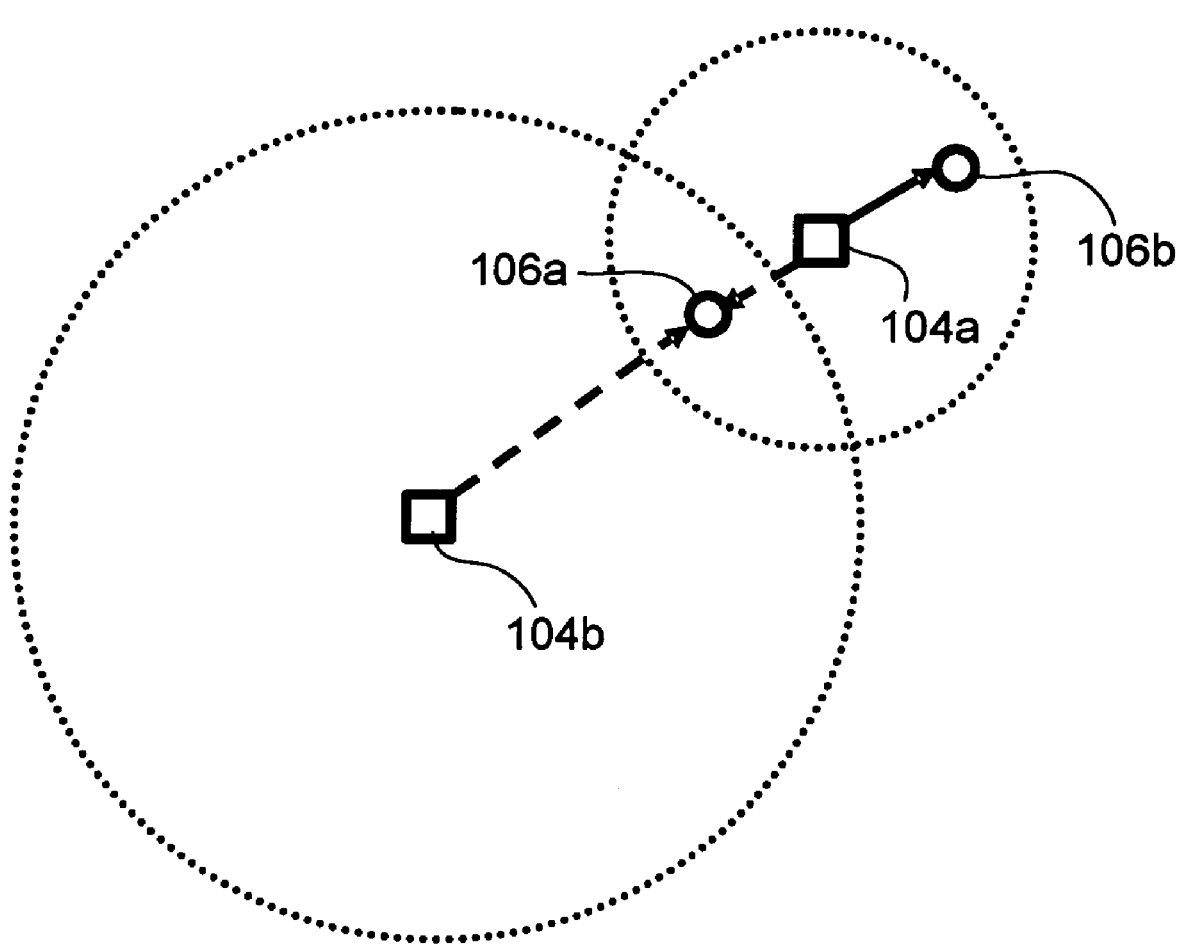

A communication network topology can be determined by selecting a set of hubs from a set of candidate sites of the communication network, assigning remote nodes to hubs, and determining assignment of uplink and downlink frequencies for a given selection of hubs and a particular assignment of remote nodes to hubs, and optimizing (e.g., minimizing) a cost function. The problem can be formulated as a linear or non-linear program, and the network topology can be determined by solving the linear or non-linear program. Approximation methods can be used to simplify the problem. For example, heuristic algorithms using a "greedy" algorithm or a "simulated annealing" approach can be used to speed up the process of finding a solution that may be close to an optimal solution.

Referring to FIG. 1, an exemplar communication network 100 includes a core network 102 and network nodes. The network nodes can be either hubs 104 or remote nodes 106. The hubs 104 connect to the central network 102 through connection lines 108 each having a certain cost. For example, the connection lines 108 can be leased lines, such as T1 or E1 lines. The remote nodes 106 connect to the hub nodes 104 through wireless links. In this example, it is assumed that each remote node 106 connects to one hub 104, and a remote node 106 does not connect directly to the core network 102 or to other remote nodes 106.

In some implementations, the communication network 100 is a cellular telephone network, the core network 102 is a switching network, such as a public switched telephone network (PSTN), and the hubs 104 and remote nodes 106 are base stations that communicate with end user terminals, such as cellular phones.

During the design stage, each of the network nodes can be assigned as a hub 104 or a remote node 106. For example, a network company may have facilities at different sites, and each site can be configured as a hub 104 or a remote node 106. The different sites can be located at different offices or floors of a building, different segments of a city, or different cities within a geographical region. The network company can install different equipment at a site based on whether the site is selected to be a hub 104 or a remote node 106. In some examples, using software defined radio equipment, a site can be configured as a hub 104 or remote node 106 by changing software configuration. The cost of setting up a site as a hub 104 can be different from the cost associated with setting up a remote node 106. For example, equipment costs can be different, the hub 104 may require an expensive leased line for connecting to the core network 102, etc.

The assignment of remote nodes 106 to hubs 104 for an uplink configuration can be different from that for a downlink configuration. For example, referring to FIG. 2, a downlink channel 110 connects a remote node 106 to a hub 104a, and an uplink channel 112 connects the remote node 106 to another hub 104b. The uplink channel 112 and downlink channel 110 use frequencies within a spectrum available to the communication network 100. Some frequencies can be reused or shared by channels subject to constraints on signal-to-interference-plus-noise (SINR) ratios.

Methods for determining the topology of the communication network 100 can be applied to determining a topology for a cellular telephone network that provides in-band backhaul. One of the primary operating expenses for a cellular network is the backhaul, the data connection between the base stations and the central switching facility. In rural areas, leased lines such as T1/E1 lines can be expensive. At the same time, in rural areas the cellular spectrum may be underutilized. It is possible to eliminate the leased lines going to some sites, and instead re-using some of the cellular spectrum to support in-band backhaul to a neighboring site that has a leased line. In this example, the sites without leased lines are the remote nodes, while the sites with leased lines that are supporting neighboring remote nodes are the hubs.

In some implementations that use software defined radio technology in cellular telephone base stations, it is possible to support in-band backhaul with no additional hardware at most sites. A single radio transmits and receives both the cellular waveform for end-user traffic and the backhaul waveform. Using software defined radio, the topology decision is less constrained than with in-band backhaul solutions that require hardware installation. Determining the network topology involves deciding (i) which nodes should be designated as hubs, which should be remote nodes, (ii) how should the remote nodes be paired up with the hubs, and (iii) what uplink or downlink frequencies should be used to connect each pair. This decision is made in a way that minimizes the overall consumption of backhaul spectrum and the overall cost of the leased lines.

Methods for determining the topology of the communication network 100 can also be applied to other contexts. For example, consider a collaborating group of mobile users who want to minimize their total cost for broadband internet access. Each user has a laptop with both an unlicensed ad-hoc wireless card (free to use) and a cellular broadband wireless client card (requiring payment to a service provider). The functionalities of the ad-hoc wireless card and the cellular broadband wireless client card can be implemented using a single software defined radio device that can perform either function or both at the same time. A user may either connect directly to the cellular service, or may connect ad-hoc to a peer and share that node's cellular broadband service, reducing overall connectivity costs. In this example, determining the network topology involves deciding (i) which nodes should be hubs, (ii) which nodes should be remote nodes, and how the remote nodes should be paired to the hubs reduce both overall consumption of spectrum for the ad-hoc links and the overall cost of the cellular broadband service.

The problem of determining the topology for the communication network 100 can be formulated as a three-part joint optimization problem that simultaneously involves (i) selecting a subset of sites to be hubs, (ii) assigning the remaining sites (remote nodes) to hubs for uplink and downlink, and (iii) allocating a specific frequency for each uplink channel and downlink channel while minimizing a cost function. A feature of this approach is that the joint formulation considers both network topology design and frequency planning at the same time. Finding a solution of this joint problem optimizes both costs involved in assigning sites as hubs or remote nodes and costs involved in allocating uplink and downlink frequencies.

The three parts of the joint optimization problem are closely related because, for example, the selection of hubs affects the assignment of uplink and downlink frequencies, and vice versa. For example, for a given set of uplink and downlink frequencies, it may be possible to find a selection of hubs that results in a lowest cost C1. For another given set of frequency assignments, there may be another selection of hubs that results in a lowest cost C2, in which C2 is lower than C1. Thus, finding a selection of hubs by optimizing a cost function for a particular frequency assignment may produce a "local" optimal solution which may not be a "global" optimal solution. Similarly, finding an assignment of uplink and downlink frequencies by optimizing a cost function for a particular selection of hubs may produce a local optimal solution which may not be a global optimal solution.

Methods for determining network topology by solving the joint optimization problem can be used in various applications, e.g., for wireless backhaul provisioning, base station selection and power control in cellular networks, and topology control and clustering in wireless networks.

As discussed above, the three-part joint optimization problem simultaneously involves (i) selecting a subset of sites to be hubs, (ii) assigning the remaining sites to hubs for uplink and downlink, and (iii) allocating a specific frequency for each uplink channel and downlink channel while minimizing a cost function. In the description below, two heuristics are proposed for solving parts (ii) and (iii) of the problem, the closest hub and the matching heuristics. The closest hub heuristic assigns each remote node to its closest hub and performs a graph coloring on the conflict graph to assign the frequencies. The matching heuristic uses an iterative matching procedure to attempt to assign remotes and frequencies to maximize frequency reuse. Two algorithms are described that use these heuristics to solve the joint problem. The first is a greedy algorithm, which starts with one hub and greedily adds more hubs to strictly reduce the cost until no further reductions can be achieved by hub addition. The second is a simulated annealing approach that uses a hill-climbing local search to produce a good solution.

2. Theoretical Framework

In section 2, a theoretical framework is provided for modeling the joint topology design and frequency planning problem as an optimization problem, and intuition is developed on the characteristics of good solvers. In some implementations, the problem can be formulated as a non-linear program, which can be approximated by a linear program. In some implementations, approximate or suboptimal methods can be used to find solutions that approximate optimal solutions. For example, two suboptimal solvers based on the greedy algorithm and the simulated annealing approach is described. Both algorithms have reduced complexity (compared with solving the linear program), perform well, and are able to solve problems of large size in a reasonable amount of time.

2.1 Network Topology

In some examples, the communication network 100 includes a collection of stationary nodes that are classified as hubs 104 or remotes 106 according to their ability to communicate with the core network 102. Every node has a primary wireless interface that enables communication between the hubs 104 and remotes 106. In addition, hub nodes 104 are equipped with secondary interfaces that allow them to connect directly to the core network 102. Remote nodes 106, on the other hand, can connect to the core network 102 only indirectly by using their primary interface to connect to a hub 104. Hub nodes 104 act as access points to the larger core network 102.

Communication between a hub 104 and a remote 106 can be unidirectional. This means that a remote 106 can receive signals from one hub (e.g., 104*a* of FIG. 2) on the downlink 110 and transmit signals to a potentially different hub (e.g., 104*b*) on the uplink 112.

The overall structure of the communication network 100 can be described as a collection of downlink clusters and uplink clusters, each including a hub 104 and zero or more remote nodes 106. Each hub 104 has two clusters associated with it: one downlink cluster that includes simplex links carrying traffic from the hub 104 to the remotes 106, and one uplink cluster that includes simplex links carrying traffic from the remotes 106 to the hub 104. The downlink and uplink clusters associated with a hub 104 can be different. For a given hub 104, either one of the clusters may be trivial (serving zero remotes) while the other one is not.

2.2 Physical Layer Characteristics

In some examples the physical layer protocol used to establish communication between hubs 104 and remotes 106 is assumed to have one or more of the following general characteristics:

Frequency division duplexing (FDD): Downlink and uplink transmissions take place in disjoint frequency bands with enough separation between them such that, with the use of bandpass filters, any interference between downlink and uplink signals is negligible. Full-duplex communication is possible.

Frequency division multiple access (FDMA): Transmissions from multiple nodes that are assigned to different channels do not interfere. This is typically implemented via techniques such as filtering, guard-bands, or cyclic prefix plus synchronization.

Independent output power per link: A node can independently vary its transmission power on a per-link basis. There is a specified maximum value $P_{max}$ applying independently to each link.

Received signal quality: The signal-to-interference-plus-noise ratio (SINR) of the received signal at each node should exceed a specified minimum value $SINR_{min}$ in order to achieve an acceptable decoder error rate.

The above general characteristics of the physical layer shape the network optimization problem. Frequency division duplexing allows decoupling of the downlink and uplink frequency allocations and timings since there is no interference between the two bands. Frequency division multiple access simplifies the frequency allocation within the uplink and downlink bands because the interference that arises is due to frequency reuse. Independent output power per link simplifies the power allocation problem, compared to systems where the sum of the power across all links is the primary limit.

Frequency reuse is desirable to reduce the cost of the network. How much reuse can be achieved for a given placement of hubs and remotes depends on the resulting interference. For the network to be feasible, all links in the network should have an SINR no less than $SINR_{min}$. The independent output power per link characteristic allows the transmitter power to be set just high enough to meet that constraint for each link. Minimizing power per link reduces interference and thereby improves frequency reuse.

2.3. Joint Remote Node Assignment and Frequency Allocation

Because maximum frequency reuse is desirable, and there is coupling between frequency reuse and interference, it is useful to quantify the relationship between the two. The following notations will be used in the equations described below:

N denotes the number of nodes in the network i→j denotes the simplex link from node i to node j.

$F_{UL}$ denotes the set of uplink frequencies $F_{DL}$ denotes the set of downlink frequencies $W_{ijf}$ is an indicator defined as follows:

$$W_{ijf} = \begin{cases} 1, & \text{if } j \to i \text{ uses } f \in F_{DL} \\ 0, & \text{otherwise.} \end{cases}$$

$Z_{ijf}$ is an indicator defined as follows:

$$Z_{ijf} = \begin{cases} 1, & \text{if } i \to j = \text{ uses } f \in F_{UL} \\ 0, & \text{otherwise.} \end{cases}$$

$P_{ij}$ denotes the transmit power for link i→j.

$\|H_{ij}\|$ denotes the channel amplitude for link i→j. It is assumed to be independent of the particular frequency used.

$N_O$ denotes the receiver noise power in one channel bandwidth.

Assume remote node i connects to hub j on the uplink. The interference experienced by link i→j can be computed by adding the received power contributed by all other links using the same frequency. Using the notation introduced above, the SINR for link i→j is given by $$SINR_{UL}(i \to j) = \frac{P_{ij}\|H_{ij}\|^2}{N_o + \sum_{k=1}^{N}\sum_{m=1}^{N}\sum_{f \in F_{UL}} P_{km}\|H_{kj}\|^2 Z_{ijf} Z_{kmf}} \quad (1)$$

The numerator in Equation (1) is the received signal power received for the link i→j. The denominator is the sum of the receiver noise plus interference from other nodes using the same frequency as the link i→j. The product of the indicators in the triple sum specifies that only the received power from other nodes transmitting in the same frequency channel is counted as interference.

Similarly, the SINR for a downlink i→j is given by $$SINR_{DL}(i \to j) = \frac{P_{ij}\|H_{ij}\|^2}{N_o + \sum_{k=1}^{N}\sum_{f \in F_{UL}} P_{km}\|H_{kj}\|^2 W_{jif} Z_{mkf}} \quad (2)$$

The difference in the uplink and downlink SINR expressions is the set of valid frequencies and the indicators.

2.4. Network Cost Model

In general, the cost of the communication network 100 can be divided into two components: capital expenses (CAPEX) and operating expenses (OPEX). CAPEX includes the cost of, e.g., radio equipment and support systems for each node. For example, CAPEX for hub nodes 104 could be higher than for remote nodes 106 since hubs 104 may require additional equipment to implement the secondary communication interface to the core network. OPEX includes, e.g., among other things the cost of spectrum use, the cost of access to the core network, site maintenance cost, and perhaps rent. In some examples, the cost model can be chosen to reflect OPEX and ignore CAPEX, since OPEX dominates in the long term.

In some examples described in this document, the OPEX cost model is based on the example of a cellular network with in-band wireless backhaul. Each node in the network 100 corresponds to a cell site and only the sites selected as hubs 104 have a direct connection to the core network 102 via, e.g., T1 lines. The rest of the nodes backhaul their traffic over the air to one of the hubs 104 and from there onto the core network 102. The choice of hubs 104 take into account T1 line fees which may vary depending on location. Spectrum cost, which depends on frequency reuse, depends on the choice of hubs 104 and the assignment of remotes 106 to hubs 104.

Based on the above observations, a model is proposed with two components:
(1) the cost of operating a given node as a hub, and
(2) the cost of using a frequency channel for communication between a hub and a remote. The total network cost is the sum of all hub costs and frequency use costs, which can be expressed mathematically as, $$\text{Cost} = \sum_{i \in H} c_i + U_f + D_f \quad (3)$$

where H represents the set of sites that are hubs 104, $c_i$ represents the cost of making site i a hub, and $U_f$ and $D_f$ represent the total number of uplink and downlink frequencies, respectively, used in the final plan. The costs $c_i$'s are normalized to the cost of using a frequency channel for a hub-remote communication.

2.5. Optimization Problem

Each node of the communication network 100 can be configured as a hub or a remote node. If there are N nodes in the communication network 100, there can be $2^N$ different configurations. Each of the possible network configurations can be regarded as a "state", and the $2^N$ possible hub/remote assignment configurations can be regarded as $2^N$ states in the solution space. An optimal communication network topology can be determined by evaluating the costs associated with each of the $2^N$ states and finding a state with the lowest cost. For each state, there can be various ways of assigning remote nodes to hubs, and assigning uplink and downlink frequencies, each with a particular associated cost. Each of the various ways of assignments is evaluated to determine whether a signal-to-interference-plus-noise ratio (SINR) is above a minimum threshold to ensure proper decoding of messages. Among the assignments whose SINR meets the threshold criterion, the assignment with the lowest cost is selected. The costs for all $2^N$ states are compared and the state with the lowest cost is selected as the optimal network topology.

The network design problem can be formulated, e.g., as an integer linear program (ILP). The ILP formulation serves as a precise statement of the problem and also provides a way of solving the problem via an ILP solver. The ILP approach can be complex for large problems. However, as computation powers of machines increase over time, problems that appear complex for today's computers may be readily solvable for future computers. The ILP approach can produce optimal solutions that can be used as references for evaluating the performances of other algorithms.

The interference constraints described above are simplified in order to pose the problem as an ILP. Otherwise, an interference model based on the SINR definitions in equations (1) and (2) would impose non-linear constraints. Specifically, writing out the constraint $\text{SINR}_{UL} \geq \text{SINR}_{min}$ using Equation (1) and rearranging terms one obtains $$P_{ij}\|H_{ij}\|^2 \geq \text{SINR}_{min}\left(N_o + \sum_{k=1}^{N}\sum_{m=1}^{N}\sum_{f \in F_{UL}} P_{km}\|H_{kj}\|^2 Z_{ijf} Z_{kmf}\right) \quad (4)$$

Note that the right-hand side contains products of the transmit power $P_{km}$ and the indicators $Z_{ijf}$ and $Z_{kmf}$, all of which are parameters in the network design problem.

One way to obtain simplified constraints is to test only for interferences between pairs of links sharing the same frequency. Suppose only link k→m uses the same frequency as link i→j. Then the interference constraint above becomes $$P_{ij}\|H_{ij}\|^2 \geq \text{SINR}_{min}(N_O + P_{km}\|H_{kj}\|^2) \quad (5)$$

Assuming all links are power-controlled such that the received power is equal to $P_{rcv}$, then substituting $P_{ij}\|H_{ij}\|^2 = P_{rcv}$ and $P_{km}\|H_{km}\|^2 = P_{rcv}$ in equation (5) and dividing on both sides by $P_{rcv}$ yields $$1 \geq \text{SINR}_{min}(\text{No/Prev} + \|H_{kj}\|^2/\|H_{km}\|^2) \quad (6)$$

Furthermore, if the links operate in the interference-limited regime, $\text{SINR}_{min} \ll P_{rcv}/N_O$, so one can approximate the interference constraint as $$\|H_{km}\|^2/\|H_{kj}\|^2 \geq \text{SINR}_{min} \quad (7)$$

Note that the last approximation results in a slightly relaxed constraint. In addition, the constraint is valid only in the case of one interferer.

A special case of equation (7) occurs when considering a pair of remote nodes 106 that connect to the same hub 104. In this case, m=j, and the interference constraint reduces to $$\|H_{km}\|^2/\|H_{km}\|^2 = 1 = 0\text{dB} \geq \text{SINR}_{min}$$

which is not satisfied for any reasonable values of $\text{SINR}_{min}$. Therefore a corollary of equation (7) is that no two remotes 106 can use the same frequency if they are connecting to the same hub 104.

In order to successfully apply the simplified interference constraint in the case of multiple interferers, the interference constraint can be tightened by increasing the required SINR by some margin. Then, if individual interferers satisfy the tightened constraint, for a large enough SINR margin it is likely that the aggregate interference will satisfy the original non-linear interference constraint. The SINR margin is chosen based upon the expected multiplicity of highest-power interferers at the receiver.

To obtain the final form of the pairwise interference constraint, the path loss between node i and node j is defined as $L_{ij} = -10 \log_{10}(\|H_{ij}\|^2)$. Then the interference constraint is given by $$L_{kj} - L_{km} \geq 10 \log_{10}(\text{SINR}_{min}) + 10 \log_{10}(\text{SINR}_{margin}) \quad (8)$$

The constraint can be interpreted as stating that link k→m would interfere with any links terminating at node j if the constraint is not satisfied.

In some examples, one can solve the ILP with an initial estimate of the SINR margin and then iterates, incrementing the SINR margin each time, until all links satisfy the non-linear SINR constraint.

The complete ILP formulation is given below in section 8.

3. Strategy for an Approximate Solution

The runtime for the ILP described in section 2 increases exponentially in relation to the number of nodes. As discussed above, when there are N nodes in the communication network 100, there are $2^N$ states that need to be evaluated. Lower-complexity heuristics can be devised using a two-part strategy:

Configuration search: Use a heuristic search over different configurations of which nodes are hubs and which are remotes. For example, a greedy algorithm and a simulated annealing approach can be used for this search.

Assignment: For each configuration, use a heuristic to assign each remote a hub and a frequency for both its uplink and downlink channels. The result of this assignment is a cost estimate that is fed back into the configuration search. In the description below, closest hub and maximum matching approaches are evaluated for the assignment.

These heuristic algorithms evaluate a subset of the $2^N$ states and find a state within the subset that has the lowest cost. The solution that is found using the heuristic algorithms can be considered a "local" optimal solution in the sense that it is an optimal solution within the subset of states that have been evaluated. Sections 4 and 5 describe the heuristic algorithms in detail. Section 4 begins with the assignment heuristic as it is a subproblem of the larger configuration search.

4. Heuristics for Remote Assignment and Frequency Allocation

The algorithms presented in this section assume that a configuration of hubs 104 has already been chosen. This means that a particular state within the $2^N$ states has been chosen for evaluation. Since the configuration fixes the hub cost, the cost function (equation 3) to be minimized reduces to minimizing the number of required uplink and downlink frequencies.

$$\text{Cost} = U_f + D_f \tag{9}$$

4.1 Closest Hub Heuristic

The closest hub heuristic includes assigning each remote node 106 to the hub 104 to which it has the lowest propagation loss. The hub 104 with the lowest propagation loss is referred to as the "closest" hub 104 for that remote node 106, although it may not be the geographically closest one (for example, there may be an obstacle between the remote node and a geographically closest hub, so the geographically closest hub has a higher propagation loss than a geographically farther hub). The following lemma provides some motivation for this heuristic.

Lemma 1: For the uplink, assigning each remote to its closest hub, followed by minimally assigning frequencies given these assignments, yields an optimal solution.

Proof: Consider a solution in which there exists a remote i that uplinks to hub j, but whose closest hub is actually k (i.e., $\|H_{ij}\|^2 < \|H_{ik}\|^2$). By assumption, all links are power-controlled so that the received power at the intended hub is $P_{rcv}$. Now, note that since node i is closer to hub k than to hub j, the received signal at hub k from node i has higher power than $P_{rcv}$. Hence, the link i→k cannot reuse any of the frequencies used by the remotes connected to hub j, otherwise it would interfere with them. Then, by reassigning remote i to hub k, the frequency cost can only improve due to reduced interference with other links. Therefore, for a given selection of hubs the optimal uplink frequency cost is achievable by assigning each remote to its closest hub.

The downlink case is different from the uplink. Assigning a remote node to be downlink from a closest hub may not be the optimal solution because such assignment may interfere with other assignments. For example, referring to FIG. 3, assigning a remote node 106a to downlink from a closest hub 104a may interfere with a downlink channel between the hub 104a and another remote node 106b. On the other hand, setting up a downlink channel between the remote node 106a and a farther hub 104b would not cause such an interference. A matching algorithm described below is used to assign remote nodes to hubs for downlinks.

Once the remotes are all assigned to hubs, the remaining problem is to assign frequencies. This can be achieved by building a conflict graph described by the interference constraints and running a graph coloring algorithm. Although graph coloring is in general an NP-complete problem, exact coloring algorithms can easily solve graphs generated by sites consisting of a large number of nodes.

4.2. Maximum Matching Heuristic

As discussed above, the closest hub assignment heuristic is not optimal for the downlink. In this section, a second heuristic is provided for the downlink assignment and allocation problem.

Intuition about this problem can be gained by considering the 2-hub case. In this case, note that a particular frequency can be used at most twice. In general, let $F_i$ represent the set of remotes utilizing a downlink frequency that is shared among exactly i remotes. For two hubs, we have that the total number of downlink frequencies used, $D_f$, is equal to, $$D_f = \frac{1}{2}|F_2| + |F_1| = N_R + \frac{1}{2}|F_2| \tag{10}$$

where we have used the fact that $|F_1|+|F_2|=N_R$, where $N_R$ is the number of remote nodes.

The equation (10) indicates that the total number of downlink frequencies can be minimized by maximizing $|F_2|$. This can be done as follows. Define an undirected graph $G=(V, E)$, where V represents the set of remote nodes. Next draw an edge (i,j) between two remotes i,j∈V if they can be assigned the same frequency and add it to the set E. Note that for two hubs, this can be easily determined by trying out all downlink assignments of i,j to the two hubs and checking against the interference constraints. Finally, a maximum cardinality matching in G can be found, yielding a set of edges M. For every edge in M, the algorithm allocates to the two endpoints of the edge the same frequency (with the corresponding downlink hub assignment), and assigns the remaining (unmatched) remotes to downlink from an arbitrary hub, on their own frequency. This results in the following:

Lemma 2: For two hubs, the maximum matching heuristic finds the optimal joint downlink hub assignment and frequency allocation. For K>2 hubs, equation (10) generalizes as follows, $$D_f = \frac{1}{K}F_K + \ldots + \frac{1}{2}F_2 + F_1 = N_R - \sum_{i=2}^{K} Q_i F_i \tag{11}$$

where $Q_i=1-1/i$.

In order to optimally solve the general problem for K>2, an analogous optimal algorithm is as follows. Define a hypergraph $H=(V, E)$, where V represents the set of remotes. Next, draw a "hyperedge" connecting I remotes if those I remotes could share a single frequency (through some remote-to-hub assignment). Assign such an edge a weight of $iQ_i=i-1$, to represent the fact that I remotes have been added to the set $F_i$. Finally, solve for a maximum weighted matching in H.

The approach outlined above may be difficult to solve. Finding a maximum weighted matching in a hypergraph is NP-complete, and constructing the hypergraph could be complicated, since determining if K remotes can be assigned on the same frequency to K hubs can take O(K!) time. The following approach is provided to address the general K-hub joint downlink assignment and frequency allocation problem.

Define a "node" to represent a set of remotes that can share a frequency. For example, a node consisting of i remotes reflects i remotes in the set $F_i$. The overall idea is to minimize a weighted set of nodes by sequentially pairwise merging nodes whose component remote nodes can share a common frequency. In order to limit the complexity of evaluating whether a set of remotes at two nodes can share the same frequency, the algorithm only remembers a constant Z ways that any particular node can be formed. Thus evaluating whether two nodes can be merged involves at most $O(Z^2)$ complexity. The overall maximum matching heuristic algorithm is described below.

Figure 4:
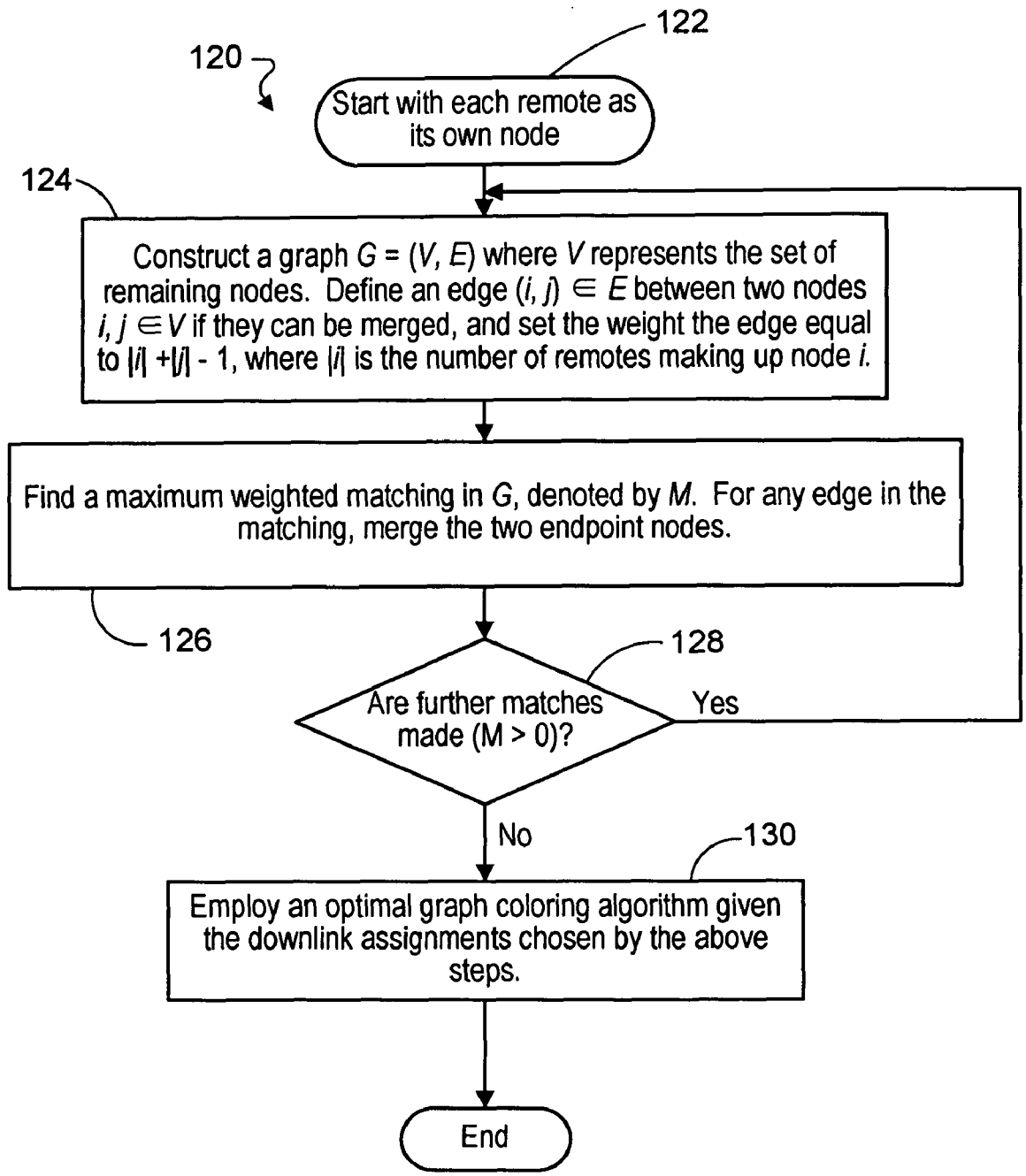
FIGS. 4-7 are flow diagrams of processes for determining network topology.

Referring to FIG. 4, an exemplar process 120 can be used to implement the maximum matching heuristic.

Step 1 (122): Start with each remote as its own node.

Step 2 (124): Construct a graph $G=(V, E)$ where V represents the set of remaining nodes. Define an edge $(i,j) \in E$ between two nodes $I, j \in V$ if they can be merged, and set the weight the edge equal to $|i|+|j|-1$, where $|i|$ is the number of remotes making up node i.

Step 3 (126): Find a maximum weighted matching in G, denoted by M. For any edge in the matching, merge the two endpoint nodes.

Step 4 (128): Repeat the graph construction steps 2 and 3 until no further matches are made, i.e., $M=0$.

Step 4 (130): Employ an optimal graph coloring algorithm given the downlink assignments chosen by the above heuristic. This ensures that the any inefficiencies for the frequency allocation subproblem are corrected for.

For a given state among the $2^N$ states, the closest hub heuristic can be used to determine the uplink assignments of remote nodes to hubs, and the maximum matching heuristic can be used to determine the downlink assignments of remote nodes to hubs.

5. Algorithms for Configuration Search

The following describes two algorithms for configuration search—a greedy algorithm and a simulated annealing approach. The configuration search can be regarded as a method of determining which subset of states among of $2^N$ states should be evaluated.

5.1. Greedy Hub Placement

In some implementations, a greedy algorithm is used to perform the configuration search. The greedy algorithm is based on the idea of sequentially adding hubs 104 such that at each step, the overall cost is maximally reduced. Note that each state represents a particular assignment of hubs and remote nodes. Thus, adding a hub (and subtracting a remote node) to the network corresponds to changing to a different state. As the greedy algorithm evaluates various network configurations have different numbers of hubs, the greedy algorithm moves from one state to another and evaluates the costs of the states. The greedy algorithm can be implemented as follows:

The algorithm starts by placing a hub 104 at an arbitrary site location. This is the first state to be evaluated. Note that any valid solution to the overall problem includes at least one hub 104. For this placement, we can calculate the ensuing cost by assigning every remote node 106 to this hub 104, on its own uplink and downlink frequencies. If there exist unassigned remote nodes 106 due to connectivity constraints (i.e., at least one remote node 106 as no viable wireless channel to any hub 104), we assume a large cost proportional to the number of such remotes 106.

In the next step, the algorithm considers changing one of the remote nodes 106 into a hub 104. Given the new hub choices, there are N−1 remaining remote nodes 106 that could be selected, and we evaluate the cost of each selection by running an assignment heuristic. The choice which results in the maximal decrease in cost (compared to the original selection of only a single hub) is taken. If no choice results in a cost decrease, the algorithm terminates.

In general, at step i, i−1 hubs will already be placed, and N−i+1 nodes will be remote nodes 106. We consider changing a single one of the remaining remote nodes 106 into a hub 104, and choose the change that gives the maximal cost decrease. If no choice results in a decrease, the algorithm terminates. We therefore at each stage attempt to greedily switch a node from being a remote node 106 to a hub 104.

The greedy algorithm, as described above, is a purely "downhill" algorithm in that it only accepts changes to a solution (e.g., hub additions) that decrease the cost. In other words, the greedy algorithm advances from a current state to a new state only if the new state has a cost lower than the current state.

The greedy algorithm is repeated for all N possible starting hub placements and the minimum solution is taken as the final solution.

5.2. Simulated Annealing

We also investigate the use of simulated annealing (SA) to find good hub configurations. Simulation results given below show that simulated annealing significantly reduces computational complexity while producing solutions that compare favorably to the optimal ILP solution.

In the simulated annealing algorithm, the current state is defined by an N×1 vector of indicators $s=\{s_i\}$, where N is the total number of nodes, each $s_i$ is an indicator which is 1 if node i is a hub node, and 0 if it is not. The cost associated with the state is denoted C(s), which is defined by equation (3). When running the algorithm, the cost is estimated by combining the known cost of the hub configuration with an estimate of the assignment cost provided by either of the algorithms in section 4.

Another state is defined to be "adjacent" if its state vector differs in only one indicator from the current one. In each iteration of the annealing algorithm, we randomly select an adjacent state $\bar{s}$. If the adjacent state has a lower cost, the new state becomes the current state. If it has a higher cost, then the new state becomes the current state with probability $$P = e^{[C(s)-C(\bar{s})]/T} \tag{12}$$

where T is a parameter called the temperature which decreases with time as the annealing progresses. Otherwise, the current state is retained until the next iteration. Note that there is some probability in each iteration that the algorithm will move "uphill" to a state with higher cost.

The temperature T is decreased in each iteration by setting $T \leftarrow \alpha T$, where $\alpha$ is a parameter between 0 and 1. From equation (12), we observe that as T decreases, the probability of making an uphill move decreases accordingly. Qualitatively, at the beginning of the search, the temperature is high and the annealing algorithm liberally traverses the search space, ideally moving towards the general region of the space containing good solutions and ignoring small features of the cost function. As the temperature decreases, it eventually begins searching more and more locally for a minimum, until finally at sufficiently low temperature it effectively becomes a downhill algorithm and converges on a local minimum.

6. System Implementation

A system for determining the topology of the communication network 100 can include a state machine that evaluating costs of states each representing a possible assignment of hubs 104 and remote nodes 106 to nodes of the communication network 100. The state machine traverses the states among the space of $2^N$ states using, for example, the greedy algorithm or the simulated annealing approach described above. For each state, a cost determination engine determines the cost of the state based on costs for setting up hub nodes, uplink frequencies for sending data from the remote nodes to corresponding hub nodes, and downlink frequencies for sending data from the hub nodes to corresponding remote nodes. For example, the cost determination engine determines the cost using equation (3) above.

Figure 5:
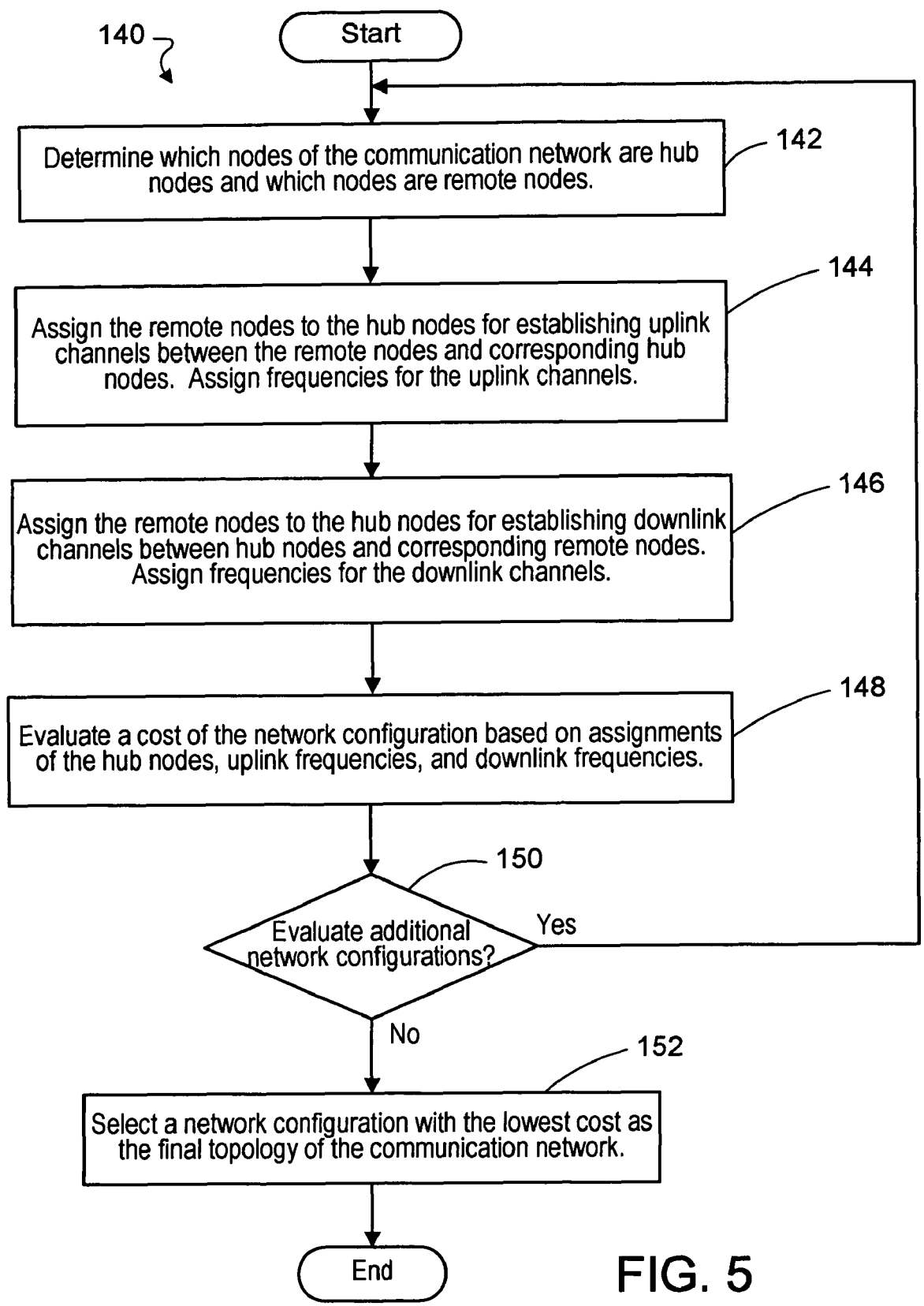

FIG. 5 is a flow diagram of an exemplar process 140 for determining a topology of a communication network using an iterative process. Each step of the iterative process includes determining which nodes of the communication network are hub nodes and which nodes are remote nodes (142). The hub nodes connect to a central network, and the remote nodes connect wirelessly to the hub nodes to obtain connectivity to the central network through the hubs. The remote nodes are assigned to the hub nodes for establishing uplink channels between the remote nodes and corresponding hub nodes, and frequencies are assigned for the uplink channels (144). The remote nodes are assigned to the hub nodes for establishing downlink channels between hub nodes and corresponding remote nodes, and frequencies are assigned for the downlink channels (146). A cost of the network configuration based on assignments of the hub nodes, uplink frequencies, and downlink frequencies is evaluated (148). A determination is made as to whether to evaluate additional network configurations (150). If an additional network configurations is to be evaluated, the process 140 repeats steps 142 to 148, otherwise the network configuration having the lowest cost is selected as the final topology of the communication network (152).

Figure 6:
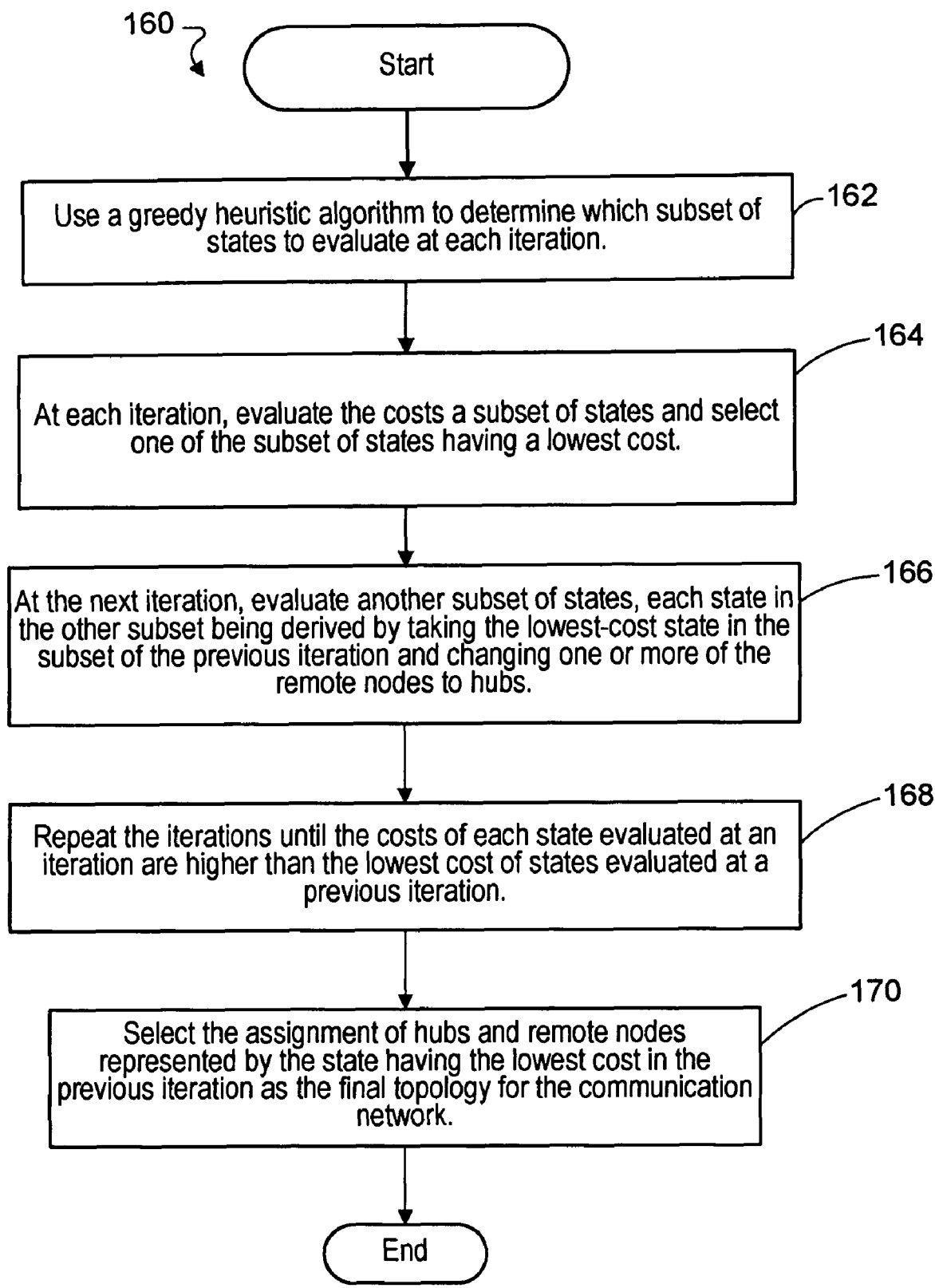

FIG. 6 is a flow diagram of an exemplar iterative process 160 for determining a topology of a communication network. A greedy heuristic algorithm is used to determine which subset of states to evaluate at each iteration (162). Each state represents a possible assignment of hubs and remote nodes to nodes of the communication network, in which the hubs connect to a central network, and the remote nodes connect wirelessly to the hubs and obtaining connectivity to the central network through the hubs. At each iteration, the costs a subset of states are evaluated and one of the subset of states having a lowest cost is selected (164). The cost of each state is determined based on costs for configuring each node as a hub or a remote node, uplink frequencies for sending data from the remote nodes to corresponding hubs, and downlink frequencies for sending data from the hubs to corresponding remote nodes. At the next iteration, another subset of states is evaluated, each state in the other subset is derived by taking the lowest-cost state in the subset of the previous iteration and changing one or more of the remote nodes to hubs (166). The iterations are repeated until the costs of each state evaluated at an iteration are higher than the lowest cost of states evaluated at a previous iteration (168). The assignment of hubs and remote nodes represented by the state having the lowest cost in the previous iteration is selected as the final topology for the communication network (170).

Figure 7:
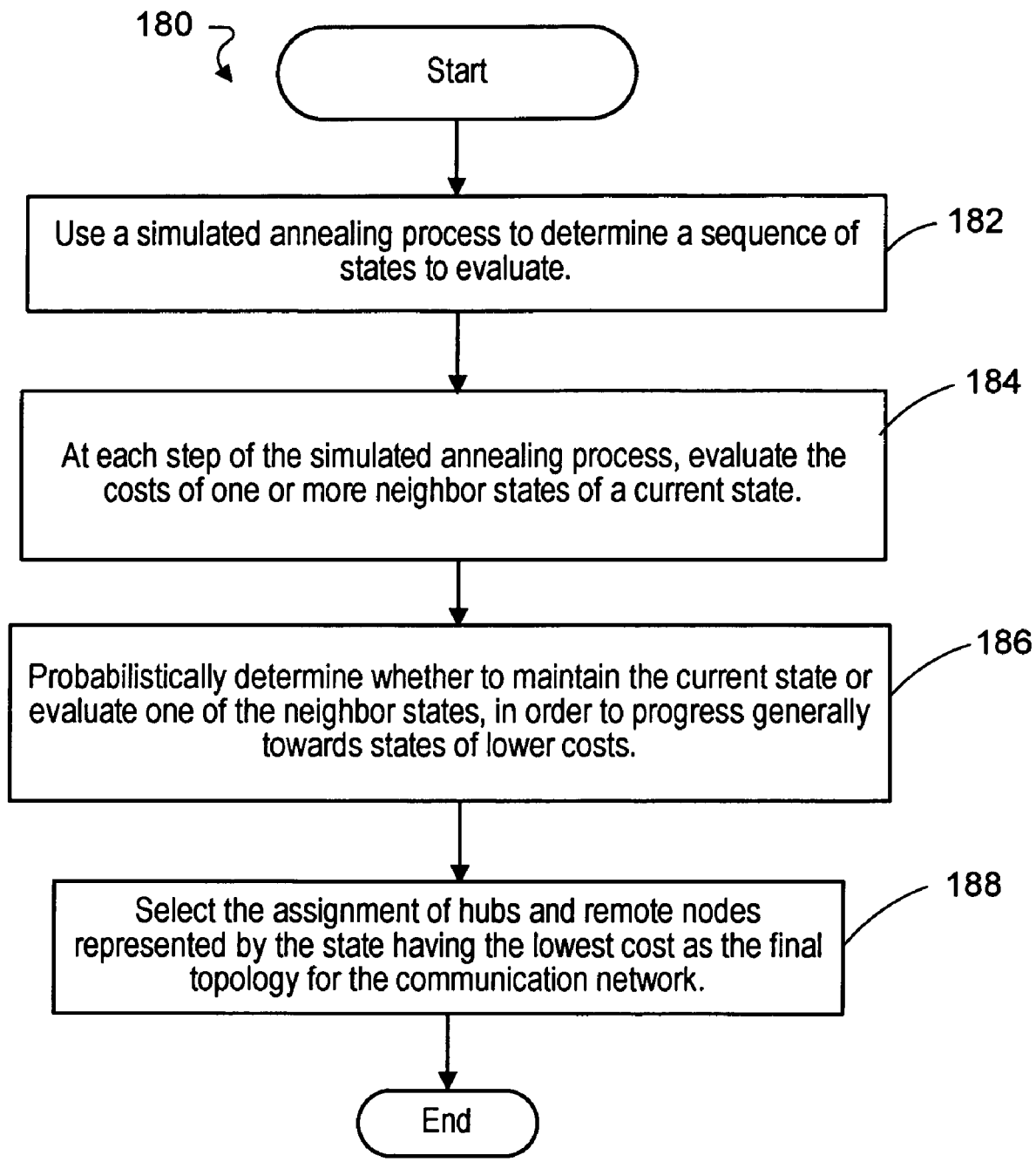

FIG. 7 is a flow diagram of an exemplar iterative process 180 for determining a topology of a communication network. The process 180 uses a simulated annealing process to determine a sequence of states to evaluate (182). Each state represents a possible assignment of hubs and remote nodes to nodes of the communication network, in which the hubs connect to a central network, and the remote nodes connect wirelessly to the hubs and obtaining connectivity to the central network through the hubs. At each step of the simulated annealing process, the process 180 evaluates the costs of one or more neighboring states of a current state (184). For example, neighboring states are defined such that two neighboring states differ from each other by one node in which the node is a hub in one of the two neighboring states and a remote node in the other of the two neighboring states. The cost of each state is determined based on costs for configuring each node as a hub or a remote node, uplink frequencies for sending data from the remote nodes to corresponding hubs, and downlink frequencies for sending data from the hubs to corresponding remote nodes. The process 180 probabilistically determines whether to maintain the current state or evaluate one of the neighbor states, in order to progress generally towards states of lower costs (186). The assignment of hubs and remote nodes represented by the state having the lowest cost is selected as the final topology for the communication network (188).

7. Simulations

The following describes simulations of the algorithms on a variety of sample instances to evaluate their performance. In the case of 15-node tests, we were able to obtain the optimal solutions by brute force using an ILP solver, and showed that both the greedy and simulated annealing heuristics obtain the optimal solutions. For larger instances, we showed that the both algorithms obtain solutions that achieve significant frequency reuse and, in the case of the city-oriented instances, made logical choices for hubs by placing them near the cities.

7.1. Test Case Generation

The performances of the simulated annealing and greedy algorithms were evaluated using test cases. Two classes of test cases were generated: "uniform" and "city" test cases.

The uniform scenario is intended to generate site plans with no predetermined bias towards any placement of hubs or remotes. In this scenario, sites are randomly placed on a square grid according to a uniform distribution. The propagation loss between any pair of points is chosen to be proportional to $1/d^{3.5}$, where d is the distance between the sites. Losses are normalized so that the loss between the closes pair of sites is 9 dB. The cost of a single frequency (in either uplink or downlink directions) is chosen to be 1. The cost of making a node a hub is chosen to be 2.5.

The "city" scenario arose naturally from the cellular backhaul context in which we first considered this problem. In a backhaul scenario, the hub OPEX cost is essentially equivalent to the lease cost of the T1/E1 line(s). The line lease cost is lower in cities than in rural areas. This is modeled in the city scenario by placing a number of "cities" within the geography and designating the cost of making any node a hub proportional to its distance from the closest city. Propagation losses between pairs of nodes are set as in the uniform case.

7.2. Results

We ran two algorithms on all of the instances: the greedy algorithm using the matching heuristic (GA), and the simulated annealer using the closest hub heuristic (SA). Additionally, since neither is guaranteed to produce an optimal solution, we also considered a few small instances of 15 nodes each and ran an ILP solver on them in order to obtain an optimal solution for comparison. To keep the complexity of the problem manageable and produce an ILP solution in a reasonable time, not all pairs of nodes had viable channels in the 15 node case; the total number of links was cut to 20% by removing all links with propagation loss above a chosen threshold for the 15-node cases only, and all algorithms run on the sparsely-connected nodes.

In the 15-node case, all 3 simulations obtained the optimal solution including a total cost of 18: a hub cost of 10 (corresponding to 4 hubs), and a total of 4 uplink and 4 downlink frequencies. This provides us with some confidence that the proposed heuristics behave well, at least for these small instances. Next, a collection of instances of varying size were generated. For each size, 10 instances were produced.

FIG. 8 shows a table 190 that gives the maximum, minimum, and mean costs for the best solution produced by each algorithm over these 10 instances. The costs are further broken down into hub and frequency components. The table shows that the GA and the SA algorithms produced solutions with similar cost. The running time of the algorithms was also comparable. On a Dual Processor Intel Xeon 2.8 GHz, the 100-node instances took roughly 2 minutes to complete for a single run of the SA, and 20 minutes for the GA. Since the annealer is a randomized algorithm, different runs can produce different solutions, so 10 runs were performed on each instance and the best solution out of those runs was chosen.

Figure 9:
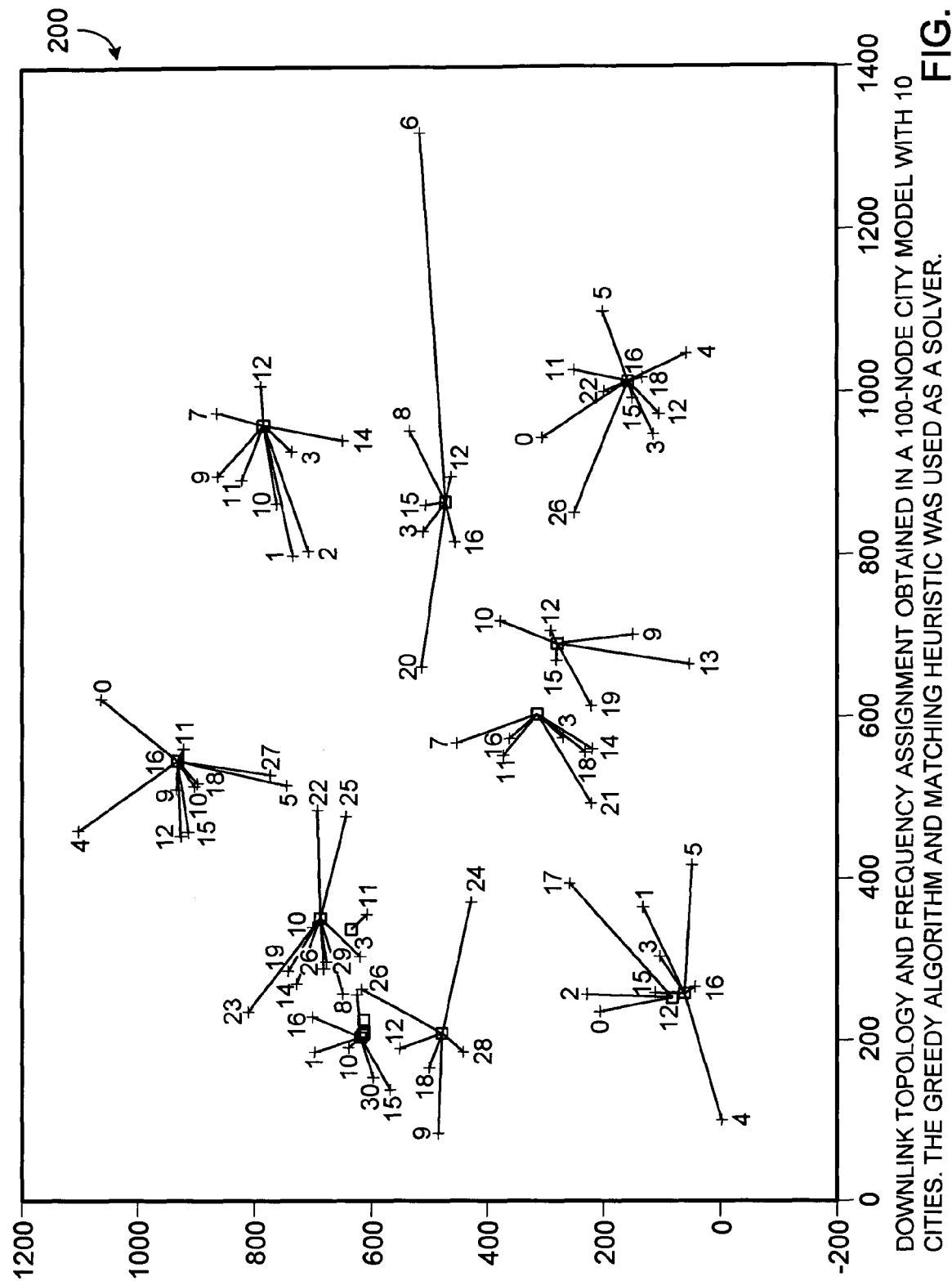

We next show site plans for particularly interesting cases. FIG. 9 is a graph 200 showing a topology and frequency plan for the downlink of a 100-node instance of the city scenario. This GA solution was generated by the greedy algorithm and the maximal matching assignment heuristic. The SA solution obtained by the simulated annealer using closest hub was similar and had virtually identical cost. This can be attributed to the nature of the city model, which lends itself to encouraging hub placement only in cities, and assigning remotes in areas away from cities. The solution space therefore consists of a relatively small number of good solutions and many bad solutions, and tends to be solved well by local search algorithms.

Figure 10:
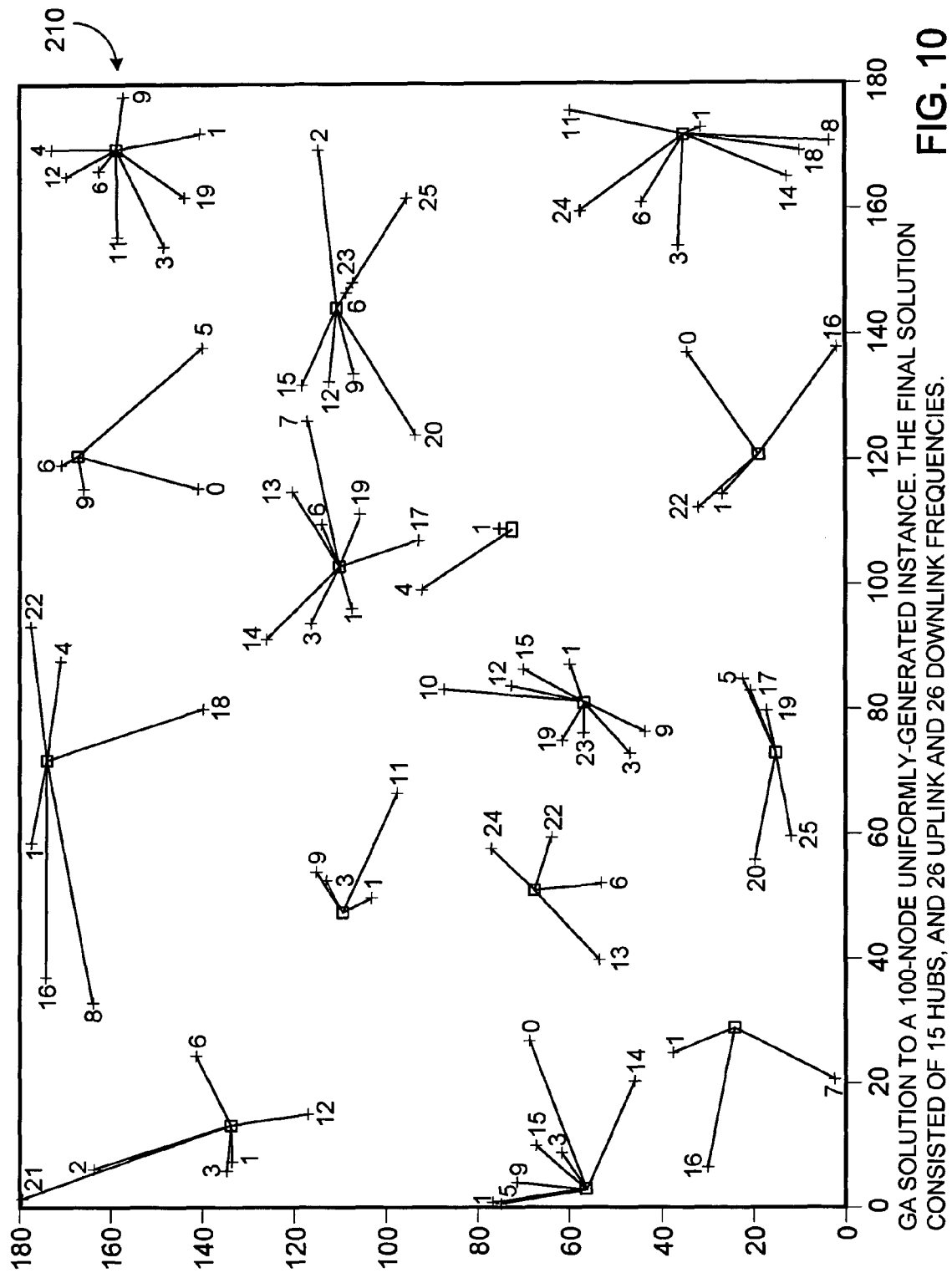

FIG. 10 is a graph 210 showing the best solutions obtained by the GA algorithm for the downlink of a 100-node uniform scenario. FIG. 11 is a graph 220 showing the best solutions obtained by the SA algorithm for the downlink of a 100-node uniform scenario. Here, the solutions have more noticeable differences. In particular, the GA tends to place fewer hubs than the annealer. This was true for all instances tested, and can be attributed to the fact that the greedy algorithm begins with only a single hub and can only add one hub at a time. If a solution with better cost requires addition of two hubs, but all possible paths to that state consisting of sequential additions of one hub at a time visit an intermediate state with higher cost, then that solution is never reached.

As a final note, we point out that since the GA and SA algorithms used different search and assignment heuristics, we are not able to attribute the differences specifically to either the greedy vs. simulated annealing search method or the closest hub vs. matching heuristic. Future work will involve simulated the annealer using the matching heuristic and the greedy algorithm using the closest hub approach, so that a comprehensive comparison can be performed.

We considered the problem of jointly designing the topology and assignment communications frequencies for a fixed point-to-multipoint network. The problem consists of (i) choosing which nodes should be hubs, (ii) assigning remotes to hubs, and (iii) performing frequency assignment on the uplink and downlink channels of each hub-remote connection.

8. ILP Formulation

The ILP formulation of the network optimization problem consists of the cost function and constraints listed below. The constraints ensure that the network topology and physical layer limitations are satisfied by the ILP solution.

(a) Cost function: The network cost is given by $$\sum_{i=1}^{N} c_i Y_i + g \sum_{f \in F_{UL}} U_f + g \sum_{f \in F_{DL}} D_f \quad (13)$$

where $c_i$ is the cost of operating node i as a hub, and g is the cost of using a single frequency. $Y_i$, $U_f$ and $D_f$ are indicators defined as follows:

$$Y_i = \begin{cases} 1, & \text{if node } i \text{ is a hub} \\ 0, & \text{otherwise.} \end{cases} \quad (14a)$$

$$U_f = \begin{cases} 1, & f \in F_{UL} \text{ is used} \\ 0, & \text{otherwise.} \end{cases} \quad (14b)$$

$$D_f = \begin{cases} 1, & \text{if } f \in F_{DL} \text{ is used} \\ 0, & \text{otherwise.} \end{cases} \quad (14c)$$

(b) A node can be either a hub or a remote: This also ensures that there are no multi-hop links in the network.

$$Y_i + \sum_{j=1}^{N} \sum_{f \in F_{UL}} Z_{ijf} \leq 1, 1 \leq i \leq N \quad (15a)$$

$$Y_i + \sum_{j=1}^{N} \sum_{f \in F_{DL}} W_{ijf} \leq 1, 1 \leq i \leq N \quad (15b)$$

(c) Link feasibility and frequency limit per link: The constraints below ensure both link feasibility and that no more than one frequency channel is used per simplex link. Feasible links are those that can be serviced within the maximum power constraint. The indicator $X_{ij}$ identifies which links are feasible, and $P_{max}$ is the maximum transmit power constraint.

$$X_{ij} = \begin{cases} 1, & \text{if } 20\log_{10}(P_{max}/No) \geq L_{ij} + 10\log_{10}(SINR_{min}) \\ 0, & \text{otherwise.} \end{cases} \quad (16)$$

$$\sum_{f \in F_{UL}} Z_{ijf} \leq Y_j X_{ij}, 1 \leq i, j \leq N \quad (17a)$$

$$\sum_{f \in F_{DL}} W_{ijf} \leq Y_j X_{ji}, 1 \leq i, j \leq N \quad (17b)$$

(d) No Frequency reuse among remotes connected to the same hub: Ensures no interference between uplinks terminating in the same hub and prevents a hub from using the same frequency to downlink to more than one remote.

$$\sum_{i=1}^{N} Z_{ijf} \leq 1, 1 \leq j \leq N, \forall f \in F_{UL} \quad (18a)$$

$$\sum_{i=1}^{N} W_{ijf} \leq 1, 1 \leq j \leq N, \forall f \in F_{DL} \quad (18b)$$

(e) Interference constraints: The pairwise interference constraints derived in Section II-E.1 are applied to all possible pairs of downlinks and uplinks to ensure that pairs of links that would interfere are not assigned the same frequency channel.

$$Z_{ijf} + \beta_{kmj}Z_{kmf} \leq 1, \forall f \in F_{UL} \quad (19a)$$

$$W_{ijf} + \beta_{mki}W_{kmf} \leq 1, \forall f \in F_{DL} \text{ for } 1 \leq i, \quad (19b)$$
$$j, k, m \leq N, k \neq i, m \neq j, \text{ where}$$

$$\beta_{kmj} = \begin{cases} 1, & \text{if } L_{kj} - L_{km} < 10\log_{10}(SINR_{min}) + 10\log_{10}(SINR_{margin}) \\ 0, & \text{otherwise.} \end{cases} \quad (20)$$

(f) Frequency cost constraints: Ensure that if a frequency channel is used by at least one link its cost is added to the network cost.

$$\sum_{i=1}^{N}\sum_{j=1}^{N} Z_{ijf} \geq Uf, \forall f \in F_{UL} \quad (21a)$$

$$\sum_{i=1}^{N}\sum_{j=1}^{N} Z_{ijf} \leq N^2 Uf, \forall f \in F_{UL} \quad (21b)$$

$$\sum_{i=1}^{N}\sum_{j=1}^{N} W_{ijf} \geq Df, \forall f \in F_{DL} \quad (21c)$$

$$\sum_{i=1}^{N}\sum_{j=1}^{N} W_{ijf} \leq N^2 Df, \forall f \in F_{DL} \quad (21d)$$

(g) No self-connection: Prevent nodes from linking to themselves.

$$W_{iif} = 0, 1 \leq i \leq N, \forall f \in F_{DL} \quad (22a)$$

$$Z_{iif} = 0, 1 \leq i \leq N, \forall f \in F_{UL} \quad (22a)$$

A number of embodiments of the invention have been described. Nevertheless, it will be understood that various modifications may be made without departing from the spirit and scope of the invention. For example, the specific algorithms and mathematical equations used for assigning hubs, assigning remote nodes to hubs, and assigning uplink and downlink frequencies can be different from those described above. The cost function can be different. The physical layer characteristics can be different. Algorithms can be developed to produce a new near-optimal solution quickly when an already-solved situation changes incrementally. Distributed versions of the algorithms can be used when central decision-making is not possible. Accordingly, other implementations are within the scope of the following claims.

We claim:

1. A computer implemented method comprising:
   determining, using at least one data processor, a topology of a communication network by evaluating costs of states each representing a possible assignment of hubs and remote nodes to nodes of the communication network, the hubs connecting to a central network, the remote nodes connecting wirelessly to the hubs and obtaining connectivity to the central network through the hubs; and
   using an iterative process to evaluate the states, and at each iteration evaluate states each representing a network topology having more hubs than those represented by states evaluated at a previous iteration;
   wherein the cost of each state is determined based on costs for configuring each node as a hub or a remote node, uplink frequencies for sending data from the remote nodes to corresponding hubs, and downlink frequencies for sending data from the hubs to corresponding remote nodes, and
   wherein when the costs of each state evaluated at an iteration are higher than the lowest cost of states evaluated at a previous iteration, the assignment of hubs and remote nodes represented by the state having the lowest cost in the previous iteration is selected as the final topology for the communication network.

2. The method of claim 1 wherein the communication network comprises a cellular telephone network.

3. The method of claim 1 wherein the hubs and the remote nodes comprise base stations for communicating with end users, the central network comprises a switched network, and the links between the remote nodes and the hubs provide in-band backhaul.

4. The method of claim 1 wherein each node can either be a hub or a remote node, and evaluating the costs of states comprises evaluating the costs of a subset of states selected from $2^N$ states, N representing the number of nodes in the communication network.

5. The method of claim 1, further comprising determining uplink relationships between remote nodes and hubs indicating which remote nodes send data upstream to which hubs.

6. The method of claim 5 wherein determining the uplink relationships comprises assigning each remote node to a closest hub and assigning uplink frequencies such that signal-to-interference-plus-noise ratios for each uplink is above a preset threshold.

7. The method of claim 6 wherein assigning each remote node to a closest hub comprises assigning each remote node to a hub that is closest geographically or a hub that results in a minimum propagation loss.

8. The method of claim 1, further comprising determining downlink relationships between hubs and remote nodes indicating which hubs send data downstream to which remote nodes.

9. The method of claim 8 wherein determining the downlink relationships comprises selecting among a plurality of possible configurations to maximize the number of remote nodes that share frequencies while maintaining the signal-to-interference-plus-noise ratios for each downlink above a preset threshold.

10. The method of claim 1, further comprising using a greedy heuristic algorithm to determine a subset of states to evaluate.

11. A computer implemented method comprising:
    determining, using at least one data processor, a topology of a communication network by evaluating costs of states each representing a possible assignment of hubs and remote nodes to nodes of the communication network, the hubs connecting to a central network, the remote nodes connecting wirelessly to the hubs and obtaining connectivity to the central network through the hubs;
    using an iterative process to evaluate the states, and at each iteration evaluate states each representing a network topology having more hubs than those represented by states evaluated at a previous iteration; and
    at each iteration evaluating a first subset of states and selecting one of the first subset of states having a lowest cost, and at the next iteration evaluating a second subset of states each derived by taking the lowest-cost state in the first subset and changing one or more of the remote nodes to hubs;

wherein the cost of each state is determined based on costs for configuring each node as a hub or a remote node, uplink frequencies for sending data from the remote nodes to corresponding hubs, and downlink frequencies for sending data from the hubs to corresponding remote nodes.

12. A computer implemented method comprising:

determining, using at least one data processor, a topology of a communication network by evaluating costs of states each representing a possible assignment of hubs and remote nodes to nodes of the communication network, the hubs connecting to a central network, the remote nodes connecting wirelessly to the hubs and obtaining connectivity to the central network through the hubs;

using an iterative process to evaluate the states, and at each iteration evaluate states each representing a network topology having less hubs than those represented by states evaluated at a previous iteration; and at each iteration evaluating a first subset of states and selecting one of the first subset of states having a lowest cost, and at the next iteration evaluating a second subset of states each derived by taking the lowest-cost state in the first subset and changing one or more of the hubs to remote nodes;

wherein the cost of each state is determined based on costs for configuring each node as a hub or a remote node, uplink frequencies for sending data from the remote nodes to corresponding hubs, and downlink frequencies for sending data from the hubs to corresponding remote nodes.

13. A computer implemented method comprising:

determining, using at least one data processor, a topology of a communication network by evaluating costs of states each representing a possible assignment of hubs and remote nodes to nodes of the communication network, the hubs connecting to a central network, the remote nodes connecting wirelessly to the hubs and obtaining connectivity to the central network through the hubs; and using a simulated annealing process to determine a sequence of states to evaluate, including at each step of the process, evaluating one or more neighbor states of a current state and probabilistically determining whether to maintain the current state or evaluate one of the neighbor states, in order to progress generally towards states of lower costs;

wherein the cost of each state is determined based on costs for configuring each node as a hub or a remote node, uplink frequencies for sending data from the remote nodes to corresponding hubs, and downlink frequencies for sending data from the hubs to corresponding remote nodes.

14. The method of claim 13 wherein neighboring states are defined such that two neighboring states differ from each other by one node in which the node is a hub in one of the two neighboring states and a remote node in the other of the two neighboring states.

15. The method of claim 11 wherein the communication network comprises a cellular telephone network.

16. The method of claim 11 wherein the hubs and the remote nodes comprise base stations for communicating with end users, the central network comprises a switched network, and the links between the remote nodes and the hubs provide in-band backhaul.

17. The method of claim 11 wherein each node can either be a hub or a remote node, and evaluating the costs of states comprises evaluating the costs of a subset of states selected from $2^N$ states, N representing the number of nodes in the communication network.

18. The method of claim 11, further comprising determining uplink relationships between remote nodes and hubs indicating which remote nodes send data upstream to which hubs.

19. The method of claim 18 wherein determining the uplink relationships comprises assigning each remote node to a closest hub and assigning uplink frequencies such that signal-to-interference-plus-noise ratios for each uplink is above a preset threshold.

20. The method of claim 19 wherein assigning each remote node to a closest hub comprises assigning each remote node to a hub that is closest geographically or a hub that results in a minimum propagation loss.

21. The method of claim 11, further comprising determining downlink relationships between hubs and remote nodes indicating which hubs send data downstream to which remote nodes.

22. The method of claim 21 wherein determining the downlink relationships comprises selecting among a plurality of possible configurations to maximize the number of remote nodes that share frequencies while maintaining the signal-to-interference-plus-noise ratios for each downlink above a preset threshold.

23. The method of claim 11, further comprising using a greedy heuristic algorithm to determine a subset of states to evaluate.

24. The method of claim 12 wherein the communication network comprises a cellular telephone network.

25. The method of claim 12 wherein the hubs and the remote nodes comprise base stations for communicating with end users, the central network comprises a switched network, and the links between the remote nodes and the hubs provide in-band backhaul.

26. The method of claim 12 wherein each node can either be a hub or a remote node, and evaluating the costs of states comprises evaluating the costs of a subset of states selected from $2^N$ states, N representing the number of nodes in the communication network.

27. The method of claim 12, further comprising determining uplink relationships between remote nodes and hubs indicating which remote nodes send data upstream to which hubs.

28. The method of claim 27 wherein determining the uplink relationships comprises assigning each remote node to a closest hub and assigning uplink frequencies such that signal-to-interference-plus-noise ratios for each uplink is above a preset threshold.

29. The method of claim 28 wherein assigning each remote node to a closest hub comprises assigning each remote node to a hub that is closest geographically or a hub that results in a minimum propagation loss.

30. The method of claim 12, further comprising determining downlink relationships between hubs and remote nodes indicating which hubs send data downstream to which remote nodes.

31. The method of claim 30 wherein determining the downlink relationships comprises selecting among a plurality of possible configurations to maximize the number of remote nodes that share frequencies while maintaining the signal-to-interference-plus-noise ratios for each downlink above a preset threshold.

32. The method of claim 12, further comprising using a greedy heuristic algorithm to determine a subset of states to evaluate.

33. The method of claim 13 wherein the communication network comprises a cellular telephone network.

34. The method of claim 13 wherein the hubs and the remote nodes comprise base stations for communicating with end users, the central network comprises a switched network, and the links between the remote nodes and the hubs provide in-band backhaul.

35. The method of claim 13 wherein each node can either be a hub or a remote node, and evaluating the costs of states comprises evaluating the costs of a subset of states selected from $2^N$ states, N representing the number of nodes in the communication network.

36. The method of claim 13, further comprising determining uplink relationships between remote nodes and hubs indicating which remote nodes send data upstream to which hubs.

37. The method of claim 36 wherein determining the uplink relationship relationships comprises assigning each remote node to a closest hub and assigning uplink frequencies such that signal-to-interference-plus-noise ratios for each uplink is above a preset threshold.

38. The method of claim 37 wherein assigning each remote node to a closest hub comprises assigning each remote node to a hub that is closest geographically or a hub that results in a minimum propagation loss.

39. The method of claim 13, further comprising determining downlink relationships between hubs and remote nodes indicating which hubs send data downstream to which remote nodes.

40. The method of claim 39 wherein determining the downlink relationships comprises selecting among a plurality of possible configurations to maximize the number of remote nodes that share frequencies while maintaining the signal-to-interference-plus-noise ratios for each downlink above a preset threshold.

41. The method of claim 13, further comprising using a greedy heuristic algorithm to determine a subset of states to evaluate.

* * * * *